United States Patent Office 3,563,951
Patented Feb. 16, 1971

3,563,951
POLYIMIDES OF HIGH MOLECULAR WEIGHT AROMATIC POLYETHER DIAMINES
Eduard Radlmann, Dormagen, Rudolf Braden, Odenthal-Scheuren, and Günther Nischk, Dormagen, Germany, assignors to Farbenfabriken Bayer Aktiengesellschaft, Leverkusen, Germany, a corporation of Germany
No Drawing. Continuation of application Ser. No. 707,988, Feb. 26, 1968. This application Oct. 16, 1969, Ser. No. 867,434
Claims priority, application Germany, Mar. 6, 1967, F 51,728
Int. Cl. C08g 20/32
U.S. Cl. 260—47                    2 Claims

ABSTRACT OF THE DISCLOSURE

The invention relates to polyimides which are soluble in organic solvents and to a process for their production by condensing aromatic tetracarboxylic acids or their derivatives with high molecular weight aromatic polyether diamines.

---

This application is a continuation of applicants' copending application Ser. No. 707,988, filed Feb. 26, 1968, and now abandoned.

This invention relates to polyimides which are stable at high temperatures and which are soluble in organic solvents and to a process for their preparation by polycondensation of aromatic tetracarboxylic acids or their derivatives with high molecular weight ether diamines.

The preparation of polyimides which are stable at high temperatures by condensation of low molecular weight aromatic primary diamines with tetracarboxylic acids or their derivatives is known.

Diamines of this type are reacted either with the free aromatic tetracarboxylic acids or with their derivatives, such as dianhydrides, di- or tetra-esters, amides, imides, or acid chlorides.

According to one known process, the dianhydrides of such tetracarboxylic acids are first reacted with the aromatic diamines in solvents, such as dimethylformamide or N-methylpyrrolidone, to form polyamidepolycarboxylic acids which are soluble in organic solvents. These are then cyclised in a second step, either by chemical means (acetic anhydride/pyridine or dicyclohexylcarbodiimide) or by heat treatment, to form polyimides which are insoluble in all organic solvents. Another disadvantage of these polyimides apart from their insolubility is their infusibility which makes it impossible to work them up into moulded articles, foils, fibres or lacquers. It is only with great difficulty that they can be worked up using the intermediate polyamide polycarboxylic acid product because such solutions are sensitive to moisture and can be stored only for a limited time. Another disadvantage is that the polyimide waste which accumulates in the course of working up cannot be used.

It is an object of this invention to provide polyimides of the general formula $$\left[\begin{array}{c} \overset{O}{\overset{\|}{C}} \quad \overset{O}{\overset{\|}{C}} \\ \diagdown \diagup \\ R \quad N-R_1-Z-R_1-N \\ \diagup \diagdown \\ \overset{\|}{C} \quad \overset{\|}{C} \\ \overset{\|}{O} \quad \overset{\|}{O} \end{array}\right]_m$$

wherein R represents a tetravalent aromatic radical selected from the group consisting of a substituted or unsubstituted phenyl, naphthyl or diphenyl radical or a radical of the formula wherein X represents oxygen, sulfur, sulfonyl, carbonyl, $$-\underset{\underset{O}{\|}}{C}-O-\quad -\underset{\underset{O}{\|}}{C}-O-R_3-O-\underset{\underset{O}{\|}}{C}-$$

or ($R_3$ alkylene or arylene); $R_1$ represents a substituted or unsubstituted bivalent aromatic radical selected from the group consisting of phenylene, naphthylene, diphenylene, alkylenephenylene or alkylenenaphthalene; and Z represents a bivalent radical of the general formula $$-\left(O-Y_1-O-\bigcirc-Y_2-\bigcirc\right)_n-O-Y_1-O-$$

or $$-\left(O-\bigcirc-Y_2-\bigcirc-O-Y_1\right)_n-O-\bigcirc-Y_2-\bigcirc-O-$$

wherein $Y_1$ represents a substituted or unsubstituted phenylene, naphthylene or diphenylene radical or a radical of the formula $$-\bigcirc-Y_2-\bigcirc-$$

and $Y_2$ represents sulfoxide, sulfonyl, carbonyl or lower alkylene, cycloalkylene or aralkylene radical, $n$ is an integer of 2 to 20 and $m$ an integer higher than 5.

These polyimides according to the invention are stable at high temperatures and soluble in strongly polar organic solvents.

It is another object of this invention to provide a process for the production of polyimides, which comprises reacting an aromatic tetracarboxylic acid or a derivative of said tetracarboxylic acid with a high molecular weight aromatic polyether diamine of the general formula $$H_2N-R_1-Z-R_1-NH_2$$

wherein $R_1$ represents a substituted or unsubstituted bivalent aromatic radical selected from the group consisting of phenylene, naphthylene, diphenylene, alkylenephenylene or alkylenenaphthylene; Z represents a bivalent radical of the general formula $$-\left(O-Y_2-O-\bigcirc-Y_2-\bigcirc\right)_n-O-Y_1-O-\text{ or}$$

$$-\left(O-\bigcirc-Y_2-\bigcirc-O-Y_1\right)_n-O-\bigcirc-Y_2-\bigcirc-O-$$

wherein $Y_1$ represents a substituted or unsubstituted phenylene, naphthylene or diphenylene radical or a radical of the formula $$-\bigcirc-Y_2-\bigcirc-$$

wherein $Y_2$ denotes sulfoxide, sulfonyl, carbonyl, or a lower alkylene, cycloalkylene or aralkylene radical and $n$ is an integer of 2 to 20, said reacting being effected at temperatures of from 0 to 350° C. in the presence or in the absence of one additional diamine or more.

The high molecular weight ether-diamines used in the preparation of the polyimides can be prepared by reacting aromatic polyethers which contain alkali metal phenolate end groups with aromatic halogenated hydrocarbons which contain a nitro group in the ortho or para-position and reducing the resulting dinitro compounds catalytically to the corresponding diamines. Thus, for example, and alkali metal salt of the bisphenol (4,4-dihydroxydiphenyl) is reacted with an aromatic bis-halogen compound (4,4'-dichloro-diphenylsulfone) in a polar organic solvent (dimethylsulfoxide) at temperatures above 60° C. in a molar ratio of between 2:1 and less than 1:1. The polyether so produced which contains alkali metal phenolate end groups is further reacted with a halogenonitroaryl compound (for example 4-nitrochlorobenzene, and the dinitro compound thus formed is reduced to the diamine using hydrogen in the presence of Raney nickel in an organic solvent.

Alternatively, an aromatic polyether containing terminal halogen groups can be reacted with alkali metal salts of mononitrophenols to form the dinitro compounds which can then be reduced catalytically to the corresponding diamines.

The high molecular weight ether diamines are represented by the following general formula $$H_2N-R_1-Z-R_1NH_2$$

wherein $R_1$ represents a substituted or unsubstituted bivalent aromatic radical selected from the group consisting of phenylene, naphthylene, diphenylene, alkylenephenylene or alkylenenaphthylene; Z represents a bivalent radical of the general formula

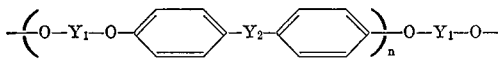

or

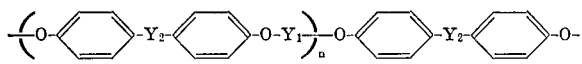

wherein $Y_1$ represents a substituted or unsubstituted phenylene, naphthylene or diphenylene radical or a radical of the formula

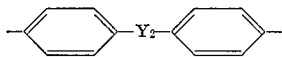

wherein $Y_2$ represents sulfoxide, sulfonyl, carbonyl, or a lower alkylene, cycloalkylene or aralkylene radical and $n$ is an integer of 2 to 20.

The amino end group content, i.e., the average molecular weight of the high molecular weight amine is determined by analytical methods, for example by titration with perchloric acid, so that it can be used in stoichiometrically accurate quantites in the polycondensation reaction with the tetracarboxylic acids or their derivatives.

Apart from the free acids, suitable derivatives of the tetracarboxylic acids for use in the reaction are the dianhydrides, di- or tetra-esters, amides, imides, or acid chlorides. The dianhydrides are examples frequently used: the lowing dianhydrides are examples frequently used: the dianhydrides of pyromellitic acid, naphthalene - 2,3,6,7-tetracarboxylic acid, naphthalene - 1,4,5,8 - tetracarboxylic acid, 3,3',4,4' - diphenyl - tetracarboxylic acid, naphthalene - 1,2,5,6 - tetracarboxylic acid, 2,2'3,3' - diphenyltetracarboxylic acid, perylene - 3,4,9,10 - tetracarboxylic acid, azobenzene tetracarboxylic acid and benzophenone-3,3',4,4'-tetracarboxylic acid.

The process can also be carried out by reacting a mixture of different aromatic tetracarboxylic acids with a high molecular weight aromatic ether diamine or with a mixture of both high and low molecular weight aromatic ether diamines.

The following are examples of low molecular weight diamines which can be used in admixture with the high molecular weight aromatic ether diamines: 4,4' - diaminodiphenylether, 4,4' - diaminodiphenylmethane, 4,4' - diamino diphenylpropane - (2,2), 1,3 - diaminobenzene, 1,4 - diaminobenzene, 4,4' - diamino - diphenyl - sulfone, benziden, 4,4' - diaminodiphenylsulfide, 3,3' - diaminodiphenylsulfone, bis - (4-amino - phenyl) - phosphine oxide, bis - (4-amino - phenyl) - diethylsilane, m-xylylenediamine, p - xylylenediamine, 2,6 - diaminopyridine, 1,5 - diaminonaphthalene, 3,3' - dimethyl - 4,4' - diaminodiphenyl, 3,3' - dimethoxybenzidine, 1,5 - di-(p - aminophenoxy) - naphthalene, 2,6 - di-(p - aminophenoxy)-napthalene, 4,4' - di-(p - aminophenoxy) - diphenyl, 4,4'-di - (p-aminophenoxy) - diphenylmethane, 4,4' - di-(p-aminophenoxy)diphenylpropane - (2,2), 4,4' - di - (p-amino - phenoxy) - diphenyl ether, 4,4' - di-(p-aminophenoxy) - diphenylsulfide, 4,4' - di-(p - aminophenoxy)-diphenylsulfone, 4,4' - di-(2''-chloro - 4''-amino - phenoxy) - diphenyl - propane - (2,2) and 1,4 - (2'-chloro-4'-amino-phenoxy)-benzene.

The process is preferably carried out in an organic solvent or using a dispersing agent. It is advantageous to react the aromatic polyether diamines with the tetracarboxylic acid dianhydrides in an organic solvent at temperatures of 0 to 50° C. to give the polyamide polycarboxylic acid intermediate stage, followed by cyclisation to the corresponding polyimides. The cyclisation is carried out either by heat treatment at temperatures of 50 to 350° C. or chemically by the action of cyclising agents such as cyclohexylcarbodiimide or acetic anhydride/pyridine at temperatures of 50 to 200° C. Suitable solvents or dispersing agents are, for example, dimethylformamide, N - methylpyrrolidone, dimethylacetamide, dimethylsulfoxide, tetramethylene sulfone, methylene chloride, acetone, tetrahydrofuran, hydrocarbons, halogenated hydrocarbons, esters, phenols, ethers, ketones, amides, sulfones-sulfoxides, toluene, o-dichlorobenzene, phenol, cresol and acetophenone.

Polyimides of the highest molecular weight are obtained when the molar ratio of aromatic tetracarboxylic acid, or a mixture of such acids, to polyether diamine, or a mixture of such diamines is 1:1, although in principle the reaction may also be carried out using one of the two components in excess.

The linear polyimides prepared according to the process of the invention, like the polyimides previously known, have an extremely high stability to heat and oxidation. Foils can be heated for several weeks at 275° C. in the air without damage. The polyimides according to the invention will also dissolve completely in organic solvents, such as N-methylpyrrolidone or dimethylsulfoxide. This is in contrast to the hitherto known polyimides. The polyimides can therefore be worked up directly from such solutions to form coatings, particularly producing heat resistant wire lacquers as well as filaments, films, foils and insulating material. Apart from their thermostability, the shaped articles produced in this way have good elasticity and hardness. Since the polyimides which can be prepared according to the invention are soluble, waste product in the course of working up can be used again. Because of their good adhesion to metal and glass surface these materials can be excellent used as coatings.

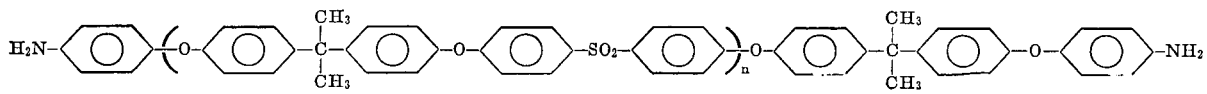

(molecular weight found: $\overline{M}n=2400$)

295 parts by weight of 2,2-bis-(4-hydroxyphenyl)-propane are dissolved in 1,000 parts by volume of diethyl sulfoxide. After the addition of 250 parts by volume of toluene and a solution of 144.9 parts by weight of solid 100% potassium hydroxide in 150 parts by volume of water, the water so added and the water produced from the salt formation is removed azeotropically from the system while nitrogen is passed through the system. All the toluene and about 5 to 10% of diethylsulfoxide are then distilled off under vacuum. After the reaction mixture has cooled to room temperature, 287 parts (by weight) of 4,4'-dichlorodiphenyl sulfone are added. The reaction mixture is condensed for 10 hours at 125° C. while being vigorously stirred and kept under a nitrogen atmosphere. 120 parts (by weight) of 4-nitro-chloro benzene are then added at room temperature. The reaction mixture is again heated to 125° C. and allowed to condense for 10 more hours.

After this, the mixture is cooled and the product precipitated in 3000 parts (by volume) of ethanol with vigorous stirring. The product is separated by suction filtration, washed with water and methanol and then dried under vacuum at 50° C. 535 parts (by weight) of a slightly

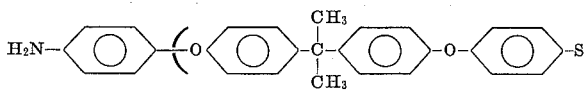

yellowish ether-sulfone oligomeric mixture which contains nitro end-groups is isolated. The material melts in the region of 130 to 137° C.

500 parts (by weight) of the dinitro compound are dissolved in 2000 parts (by volume) of dimethylformamide and hydrogenated with 80 parts (by weight) of Raney nickel under a hydrogen pressure of 50 excess atmospheres in an autoclave for 3 hours. After removal of the reduction catalyst, the product is precipitated in 2000 parts (by volume) of methanol with vigorous stirring, separated by suction filtration and dried under vacuum at 50° C. 427.7 parts (by weight) of the homologous polymeric diamine mixture is obtained in a pure form. The diamine melts in the region of 148 to 155° C. Amino end group analysis by titration with perchloric acid indicates an average molecular weight of the homologous polymeric diamine mixture of $\overline{M}n=2400$.

The folowing examples are to further illustrate the invention without limiting it.

In the examples the parts by weight correspond to the parts by volume as kg. to liter.

EXAMPLE 1

2.18 parts by weight of pyromellitic acid anhydride are added in portions at 10 to 15° C., with cooling, to a solution of 24.0 parts by weight of the homologous polymeric mixture of ether sulfone diamine.

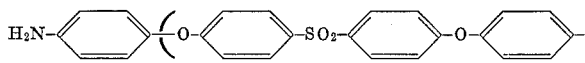

(molecular weight found: $\overline{M}n=2400$)

in 105 parts by volume of anhydrous dimethylformamide. To complete the reaction, stirring is continued for several hours at room temperature and highly viscous polyamide polycarboxylic acid solution having a solids content of about 20% is obtained which was poured out on glass plates to form foils. These are partly dried at 80° C. and then tempered at 250° C. for 24 hours. The yellow polyimide foil so obtained is also soluble in N-methylpyrrolidone and can again be worked up to a foil from such a solution. The tensile strength of the foil is 6.9 kg./mm.² and its elongation on tearing is 9.5%. It can be heated in air at 200° C. for 14 days without noticeable decomposition. The polyimide can be wet spun from N-methyl-pyrrolidone. The filaments so obtained have a strength of 2.5 g./den in the unstretched state.

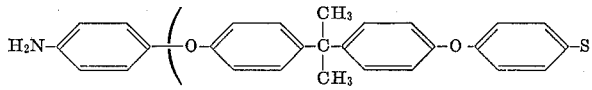

EXAMPLE 2

24.0 parts by weight of the diamine.

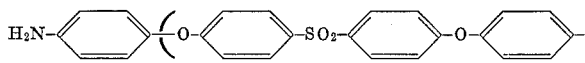

(molecular weight found: $\overline{M}n=2400$)

and 2.0 parts by weight of 4,4'-diamino-diphenyl ether are dissolved together in 130 parts by volume of anhydrous N-methylpyrrolidone and treated with portions of 6.44 parts by weight of azo benzene tetracarboxylic acid dianhydride at room temperature. Stirring is continued for several hours at room temperature. The highly viscous polyamide polycarboxylic acid solution which has a solids content of about 20% is heated at 130 to 140° C. for 7 hours to effect cyclisation. The resulting polyimide remains in solution. As described in Example 1, foils are cast from the solution and tempered for 24 hours. The tensile strength of such foils is in the region of 5.8 kg. wt./mm.², the elongation on tearing is 8.4% and the heat resistance above 350° C.

Preparation of the aromatic polyether diamine:

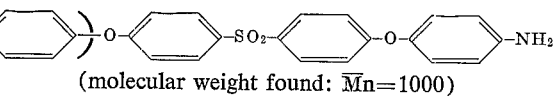

(molecular weight found: $\overline{M}n=1000$)

250.0 parts by weight of 4,4'-dihydroxydiphenylsulfone are dissolved in 1500 parts by volume of dimethylsulfoxide. 600 parts by volume of benzene and a solution of 112.0 parts by weight of solid 100% potassium hydroxide in 125 parts by volume of water are added to this solution. The water so added and that formed by salt formation is then removed azeotropically from the system while maintaining a nitrogen atmosphere. All the benzene and about 5 to 10% of the dimethylsulfoxide are then distilled off under vacuum. After cooling to room temperature, 143.5 parts by weight of 4,4'-dichlorodiphenylsulfone are added and the product is condensed at 125° C. for 6 hours under nitrogen. After cooling to room temperature, 166 parts by weight of 4-nitro-chloro-benzene are added and the product is condensed for a further 8 hours at 125° C. under nitrogen. After cooling, the product is precipitated in 2000 parts by volume of methanol with vigorous stirring, separated by suction filtration, washed with water and methanol to remove any potassium chloride still present, and dried in vacuo at 50° C. 410 parts by weight of a colourless homologous polymeric mixture of ether sulfone which contains terminal nitro groups are obtained. The material melts in the region of 148 to 155° C.

400 parts by weight of the dinitro compound are dissolved in 2000 parts by volume of dimethylformamide and hydrogenated with 80 parts by weight of Raney nickel in

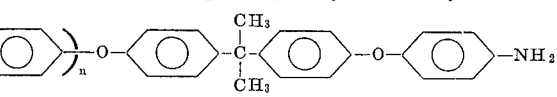

an autoclave for 4 hours at 60° C. under a hydrogen pressure of 50 excess atmospheres. The Raney nickel is then separated. The product is precipitated in 2000 parts by volume of methanol with vigorous stirring, filtered off under suction and dried in vacuo at 50° C. 330 parts by weight of the homologous polymeric mixture of ether sulfone diamine are obtained in a pure form. The material melts in the region of 162 to 170° C. Amino end group analysis by titration with perchloric acid indicates an average molecular weight of $\overline{M}n=1000$.

EXAMPLE 3

4.36 parts by weight of pyromellitic acid dianhydride are added in portions at 10 to 15° C., with cooling, to a solution of 20.0 parts by weight of the homologous polymeric mixture of ether sulfone diamine

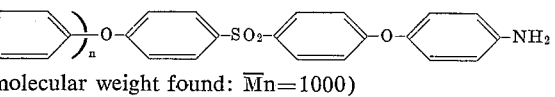

(molecular weight found: $\overline{M}n=1000$)

in 98 parts by volume of anhydrous dimethylformamide.

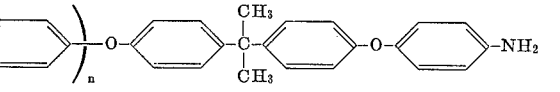

The reaction mixture is stirred several hours at room temperature. A highly viscous, light brown solution of polyamide polycarboxylic acid which has a solid content of about 20% is obtained. Foils cast on glass plates and polished metal surfaces are first predried at 90° C. and then tempered for 24 hours at 275° C. The polyimide foils adhere firmly to glass and metal surfaces and are

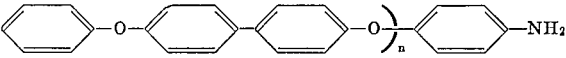

soluble in dimethylsulfoxide and N-methylpyrrolidone. The foil has a tensile strength of 7.5 kg./mm.² and an elongation on tearing of 8.9%. Foils of this type withstand temperatures of 275° C. for 8 to 10 weeks in air without noticeable degradation.

A wire of 0.7 mm. is lacquered to a thickness of 0.7 mm. with a solution of this polyimide. A vertical stoving oven 4.20 m. in height is used. The temperature registered in this oven rises from 220 to 350° C. The draw-off speed for the wire may be varied from 5 m./min. to 8 m./min. The wire is drawn through 6 times. The wire lacquer obtained has excellent thermal properties. After the wire has undergone aging for several weeks at 275° C., it can still be wound as before.

Polyamide filaments spun from N-methylpyrrolidone solution have a strength of 3 g./den. in the unstretched state.

Preparation of the aromatic poly ether diamine:

35.2 parts by weight of 2,6-dihydroxy-naphthalene and 62.5 parts by weight of 4,4'-dihydroxy-diphenylsulfone are dissolved in 1500 parts by volume of tetramethylenesulfone, and 500 parts by volume of benzene and a solution of 37.6 parts by weight of solid 100% sodium hydroxide in 60 parts by volume of water are added. The water is removed from the system by azeotropic distillation while a nitrogen atmosphere is maintained. All the benzene and 5 to 10% of tetramethylene sulfone are then distilled off under vacuum. After the addition of 89.0 parts by weight of 3,4,3',4'-tetrachlorodiphenylsulfone at room temperature, the reaction mixture is heated to 140° C. and condensed for 6 hours with vigorous stirring under nitrogen. 83 parts by weight of 4-nitro-chloro-benzene are then added at room temperature. Condensation is continued for another 6 hours at 140° C. The reaction mixture is then cooled and the product is precipitated in 3000 parts by volume of methanol with vigorous stirring, separated by suction filtration, washed with methanol and dried in a vacuum at 50° C. 131.5 parts by weight of a pale pink polymeric mixture of the ether sulfone condensate which contains nitro end groups are isolated. The material melts in the region of 112 to 124° C.

120 parts by weight of the nitro compound are dissolved in 1500 parts by volume of dimethylformamide and hydrogenated with 80 parts by weight of Raney nickel at 60° C. and using a hydrogen pressure of 50 atmospheres in an autoclave for 4 hours. After removal of the nickel, the product is precipitated in 2000 parts by volume of methanol with vigorous stirring, filtered off with suction and dried in vacuo at 50° C. 98.2 parts by weight of the polymeric mixture of the ether sulfone diamine which has a melting range of 130 to 141° C. are obtained. The average molecular weight obtained by determination of the amino end groups, is $\overline{M}n=1180$.

EXAMPLE 4

4.36 parts by weight of pyromellitic acid dianhydride are added in portions to a solution of 23.6 parts by weight of the homologous-polymeric mixture of the ether sulfone diamine as described above, having an average molecular weight $\overline{M}n=1180$ in 108 parts by volume of anhydrous N-methylpyrrolidone with cooling at 0° C. The reaction mixture is then stirred for 10 hours at room temperature. A viscous brown polyamide polycarboxylic acid solution which has a solids content of about 20% is formed. Films cast on glass plates are partly dried at 90° C. and then tempered at 275° C. for 24 hours. The polyimide foils formed are soluble, e.g., in dimethylsulfoxide or N-methylpyrrolidone, and will withstand temperatures of 200° C. for several weeks without becoming brittle.

Tensile strength of the foils from 4 to 6 kg. wt./mm.² and elongation on tearing of 6% are obtained.

Preparation of the aromatic polyether diamine (average molecular weight: $\overline{M}n=2560$)

465 parts by weight 4,4'-dihydroxydiphenyl are dissolved in 8000 parts by volume of dimethylsulfoxide. After addition of 200 parts by weight of 100% NaOH and dissolving at 100° C. the water formed is distilled off together with 5 to 10% dimethyl sulfoxide. 574 parts by weight of 4,4'-dichlorodiphenylsulfone are added at 70–80° C. Condensation is carried out for 10 hours at 125° C. under an atmosphere of nitrogen. Thereafter 236 parts by weight of 4-nitrochlorobenzene are added and condensation is continued for 5 hours more at 125° C. The sodium chloride precipitated is then filtered off and the dimethyl sulfoxide distilled off in vacuo as far as possible. The residue is refluxed twice for 2 hours with a mixture of 4000 parts by weight volume of acetone and 3000 parts by volume of methanol to remove the excess 4-nitro-chlorobenzene, then filtered by suction, washed with methanol and dried at 100° C. in vacuo. Yield: 973 parts by weight, melting interval 228–244° C.

822 parts by weight of the dinitrocompound thus obtained are dissolved in 3000 parts by volume of dimethylformamide and hydrogenated for 3 hours at 120° C. and a hydrogen pressure of 50 atmospheres with 70 parts by weight of Raney-nickel in an autoclave. After separation of the catalyst the dimethylformamide is distilled off in vacuo as far as possible and the concentrated solution thus obtained is precipitated in 1000 parts by volume of methanol while vigorously stirring. The precipitated polymer is filtered off by suction and dried at 100° C. in vacuo Yield: 750 parts by weight, melting interval 239–249° C. Average molecular weight (by determination of the amino end groups): $\overline{M}n=2560$.

EXAMPLE 5

To a solution of 25.6 parts by weight of the polymer-homologue mixture of the polyatherdiamine as described above ($\overline{M}n=2560$) in 111 parts by weight of dimethylformamide are added while stirring and cooling to 0–10° C. 2.18 parts by weight of pyromellitic acid dianhydride. Stirring is continued for another 10 hours at room temperature. A highly viscous solution of the polyamide-polycarboxylic acid is obtained, having a solids content of 20%. Foils can be cast from this solution, which are predried at 80° C. and tempered for 24 hours at 275° C. The brown polyimide foils obtained are soluble in N-methyl pyrrolidone or dimethyl sulfoxide and can be exposed to a temperature of 275° C. for more than 10 weeks without embrittling. The tensile strength of the foils is 10 kg. wt./mm. the elongationed break 15–20%.

What is claimed is:

1. An organic solvent soluble polyimide consisting essentially of the general formula

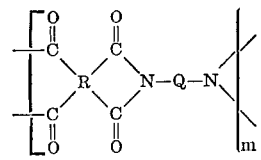

wherein R represents a tetravalent aromatic radical selected from the group consisting of a phenyl radical, a naphthyl radical, a peryl radical, a diphenyl radical and a radical of the formula

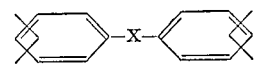

wherein $x$ represents

or —N=N— wherein Q is a member selected from the group consisting of (1) all Q's are —$R_1$—Z—$R_1$— wherein $R_1$ represents a bivalent aromatic radical selected from the group consisting of a phenylene radical, a naphthylene radical, a diphenylene radical, an alkylene-phenylene radical, and an alkylenenaphthylene radical; and Z represents a bivalent radical selected from the group consisting of

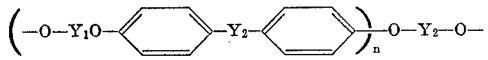

and

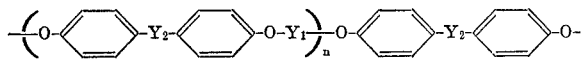

wherein $Y_1$ represents a bivalent radical selected from the group consisting of a phenylene radical, a naphthylene radical, a diphenylene radical, and a radical of the formula

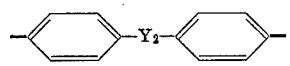

wherein $Y_2$ represents sulfonyl or lower alkylene; and $n$ is an integer of 2 to 20 and (2) some Q's are —$R_1$—Z—$R_1$— (1) and the remaining Q's are selected from the group consisting of diphenylene ether, diphenylene methane, diphenylene propane, phenylene, diphenylene, sulfone, diphenylene, diphenylene sulfide, bis(phenylene) phosphine oxide, bis(phenylene) diethylsilane, phenylene dimethylene, pyridylidene, naphthylidene, dimethyl diphenylene, dimethoxy diphenylene, di(phenyleneoxy) naphthylene, di(phenyleneoxy) diphenyl, di(phenyleneoxy) diphenylmethane, di(phenyleneoxy)diphenylpropane, di(phenyleneoxy) diphenyl ether, di(phenyleneoxy) diphenylsulfide, di(phenyleneoxy) diphenylsulfone, di(chloro phenyleneoxy) diphenyl propane, and di(chloro phenyleneoxy) benzene and $m$ is an integer higher than 5.

2. The polyimide of claim 1 wherein Q is (2) and the molar amount of said remaining Q's is up to 50% of the total Q's.

References Cited

UNITED STATES PATENTS 3,179,614   4/1965   Edwards _____ 260—30.2

WILLIAM H. SHORT, Primary Examiner

L. L. LEE, Assistant Examiner

U.S. Cl. X.R.

260—30.2, 30.8, 32.4, 32.6, 32.8, 33.2, 33.6, 33.8, 49, 65, 78

UNITED STATES PATENT OFFICE
CERTIFICATE OF CORRECTION

Patent No. 3,563,951    Dated February 16, 1971

Inventor(s) EDUARD RADLMANN, RUDOLF BRADEN AND GÜNTHER NISCHK E

It is certified that error appears in the above-identified patent and that said Letters Patent are hereby corrected as shown below:

| Column | Line | Error |
| --- | --- | --- |
| 2 | 52 (formula) | "$-(O-Y_2...$" should be --- $-(O-Y_1...$ --- |
| 3 | 3 | "and" should be --- an--- |
| 3 | 10 | "nitrochlorobenzene" should be ---nitrochlorobenzene)--- |
| 3 | 22 | "$H_2N-R_1-Z-R_1NH_2$" should be ---$H_2N-R_1-Z-R_1-NH_2$--- |
| 3 | 52 | after dianhydrides should be however, are, preferred. The following diahydrides |
| 3 | 52 & 53 | Delete - the lowing dianhydri are examples frequently used: |
| 9 | 12 | " 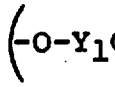 should be --- 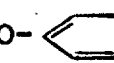 |

Signed and sealed this 21st day of September 1971.

(SEAL)
Attest:

EDWARD M. FLETCHER, JR.
Attesting Officer

ROBERT GOTTSCHALK
Acting Commissioner of Pater